United States Patent [19]

Tomioka et al.

[11] Patent Number: 5,257,412
[45] Date of Patent: Oct. 26, 1993

[54] RADIO TELECOMMUNICATION APPARATUS HAVING AN OPERATION DISABLING SYSTEM

[75] Inventors: Munehisa Tomioka; Shinya Takahashi, both of Tokyo, Japan

[73] Assignee: Kabushiki Kaisha Toshiba, Kawasaki, Japan

[21] Appl. No.: 707,817

[22] Filed: May 30, 1991

[30] Foreign Application Priority Data

May 31, 1990 [JP] Japan .................................. 2-142954

[51] Int. Cl.$^5$ ............................................... H04B 1/40
[52] U.S. Cl. ....................................... 455/89; 455/33.1;
379/58; 379/59; 340/825.5
[58] Field of Search .................. 455/33.1, 26.1, 58.1,
455/89; 340/825.3, 825.31, 825.32, 825.34,
825.5, 825.56; 379/62, 58, 59

[56] References Cited

U.S. PATENT DOCUMENTS 4,843,385  6/1989  Borras ........................... 340/825.32
4,945,556  7/1990  Namekana ........................ 379/58
5,077,790 12/1991  D'Amico et al. .................. 379/62

FOREIGN PATENT DOCUMENTS

0287061A2 10/1988 European Pat. Off. .
62-011354  1/1987 Japan .

Primary Examiner—Reinhard J. Eisenzopf
Assistant Examiner—Chi Pham
Attorney, Agent, or Firm—Banner, Birch, McKie & Beckett

[57] ABSTRACT

The automobile telephone apparatus comprises the EEPROM, into which a telephone number MIN, and a system identification number SID of a geographical area corresponding thereto are written before shipment. A predetermined operation disabling code is stored in the EEPROM, and the apparatus is disabled while this code is stored therein. Each of the product apparatus is assigned with its own disabling code. When the assigned disabling code is input to the CPU from the keyboard, the CPU erase the disabling code stored in the EEPROM, enabling the apparatus to be used. A purchaser who buys this automobile telephone apparatus informs the service company of the serial number of the apparatus, along with his or her name and address. When the contract between the company and the user for registration has been completed, the user is informed of the operation disabling code of the purchased apparatus. Upon inputting the disabling code by the user, the prohibition of the operation is released, and therefore, the apparatus becomes ready to be used.

17 Claims, 5 Drawing Sheets

RADIO TELECOMMUNICATION APPARATUS HAVING AN OPERATION DISABLING SYSTEM

BACKGROUND OF THE INVENTION

1. Field of the Invention

The present invention relates to a radio telecommunication apparatus such as a personal radio telecommunication apparatus and a mobile telephone apparatus.

2. Description of the Related Art

These days, mobile telephone apparatus can be purchased directly from electrical shops. In order to utilize the facilities offered by a mobile telephone service, a purchaser of a mobile telephone set signs a contract with a desired mobile telephone company and registers his or her telephone. More specifically, the purchased telephone set is brought to a nearby service branch of the company to register the manufacture number (serial number) of the telephone along with the personal information such as user's name and address. Upon registration, the system identification number (SID), which is a base station area number, and the mobile identification number (MIN), which is a telephone number, are determined and written in the IDROM of the telephone. These identification numbers are used in transmission and reception of a call. When the ID numbers are written in the IDROM, the telephone is ready to be used. Of course, if not, the telephone is not usable.

Similarly, a personal radio telecommunication apparatus, when purchased, cannot be used unless a required registration procedure is completed. However, it is not necessary for the purchaser to bring the apparatus to a service branch, unlike in the case of mobiles telephone. Since personal radio telecommunication apparatus are designed so that the IDROMs can be removed from the main body, the purchaser may send the IDROM of the apparatus by mail to a personal radio telecommunication association. After assigning necessary ID numbers to the IDROM and writing them therein, the association returns it to the user. The apparatus is ready to be used when the user mount the IDROM back to the main body.

With the above-described conventional apparatus, sending the IDROM to the personal radio association by the purchaser and returning the IDROM after writing the ID numbers to the user by the association has been advantageous for mobile telephone service companies and the association because wrongful use of mobile telephones or personal radio telecommunication apparatus by persons who have not made a contract therewith, can be prevented. However, at the same time, sending the IDROM to the personal radio association by the purchaser and returning the IDROM after writing the ID number to the user by the association has been disadvantageous for the users because the apparatus cannot be used at the time of purchase and it takes much procedure and time before the purchased apparatus can be actually used.

SUMMARY OF THE INVENTION

The object of the present invention is to provide a radio telecommunication apparatus which can be used from the time of purchase while preventing wrongful use of apparatus by persons who have not made contract with the company.

According to the present invention, there is provided a radio telecommunication apparatus comprising memory means for storing predetermined data, means for judging whether or not the predetermined data is stored in the memory means upon turning on the apparatus, and for prohibiting the operation of the apparatus if the data is stored therein, and allowing the operation if not, and means for erasing the predetermined data stored in the memory means while the operation of the apparatus is prohibited.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and together with the general description given above and the detailed description of the preferred embodiments given below, serve to explain the principles of the present invention in which.

DETAILED DESCRIPTION OF THE PREFERRED EMBODIMENTS

Figure 1:
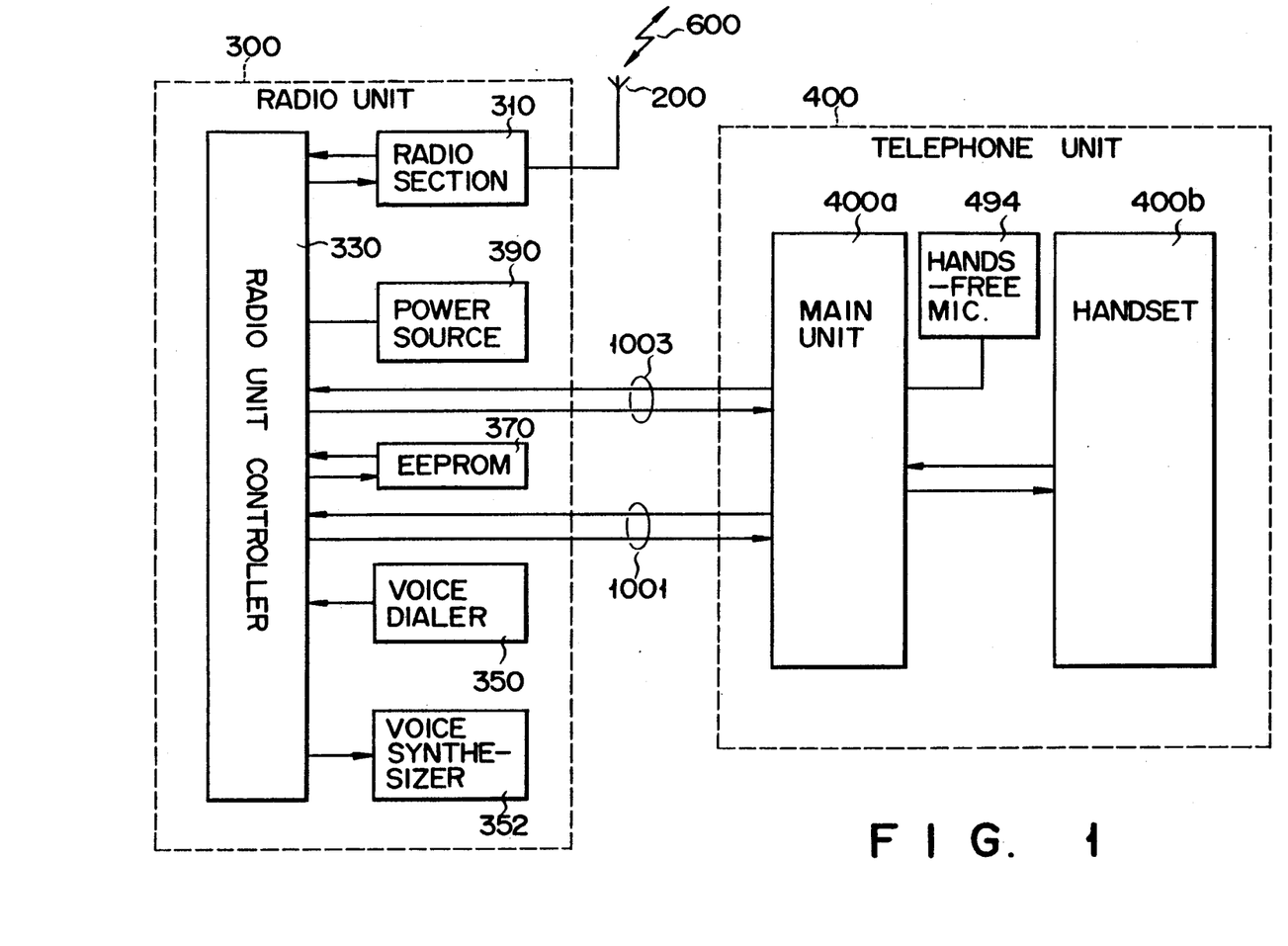
FIG. 1 is a block diagram showing the overall view of a radio telecommunication apparatus according to an embodiment of the present invention.

An embodiment of a radio telecommunication apparatus according to the present invention will now be explained with reference to the accompanying drawings. A block diagram of a overall brief structure of the first embodiment is shown in FIG. 1. The explanation will be based on a mobile telephone apparatus. The mobile telephone apparatus of this embodiment is formed of an antenna 200, a radio unit 300, and a telephone unit 400. The antenna 200 is mounted on an outer body surface of an automobile (not shown). The radio unit 300 is provided preferably within the trunk of the automobile. The telephone unit 400 is formed of a main body 400a and a handset 400b, and is mounted near the driver's seat in the automobile.

In general mobile telephone system, a geographical area is covered and served by dividing the area into a plurality of small zones (called cells). A base station is provided for each of the cells, and the mobile telephone apparatus located in a cell are connected by radio to the base station of the cell. The base stations located in a geographical area are connected by radio to a radio channel control station, and the radio control stations in a number of geographical areas are connected to a mobile telephone switching office, and this switching office is connected to the general office of the wire telephone network.

The radio unit 300 comprises a radio section 310 for establishing a radio channel 600 on which signals are transmitted and received between the antenna 200 and the base stations via the antenna 200, a radio unit controller 33 for controlling the overall operations of the apparatus, a voice dialer 350 for speech recognition in order to generate the dial number signal based on the speech of the user, a voice synthesizer 352 for synthesizing a speech to provide various voice information as a guidance, an electrical erasable programmable read-only memory (EEPROM) 370 for storing a telephone number (MIN), a system identification number (SID) of the area corresponding to the telephone number, a received system identification number RSID transmitted from the base stations, and a predetermined operation disabling code designed to prohibit the communication operation of the telephone, and a power source 390 connected to a battery mounted in the automobile for supplying power to the respective components of the apparatus. While the disabling code is stored in the EEPROM 370, the communication operation of the telephone is prohibited, and the telephone cannot be used for a communication purpose unless the code is erased.

Figure 2:
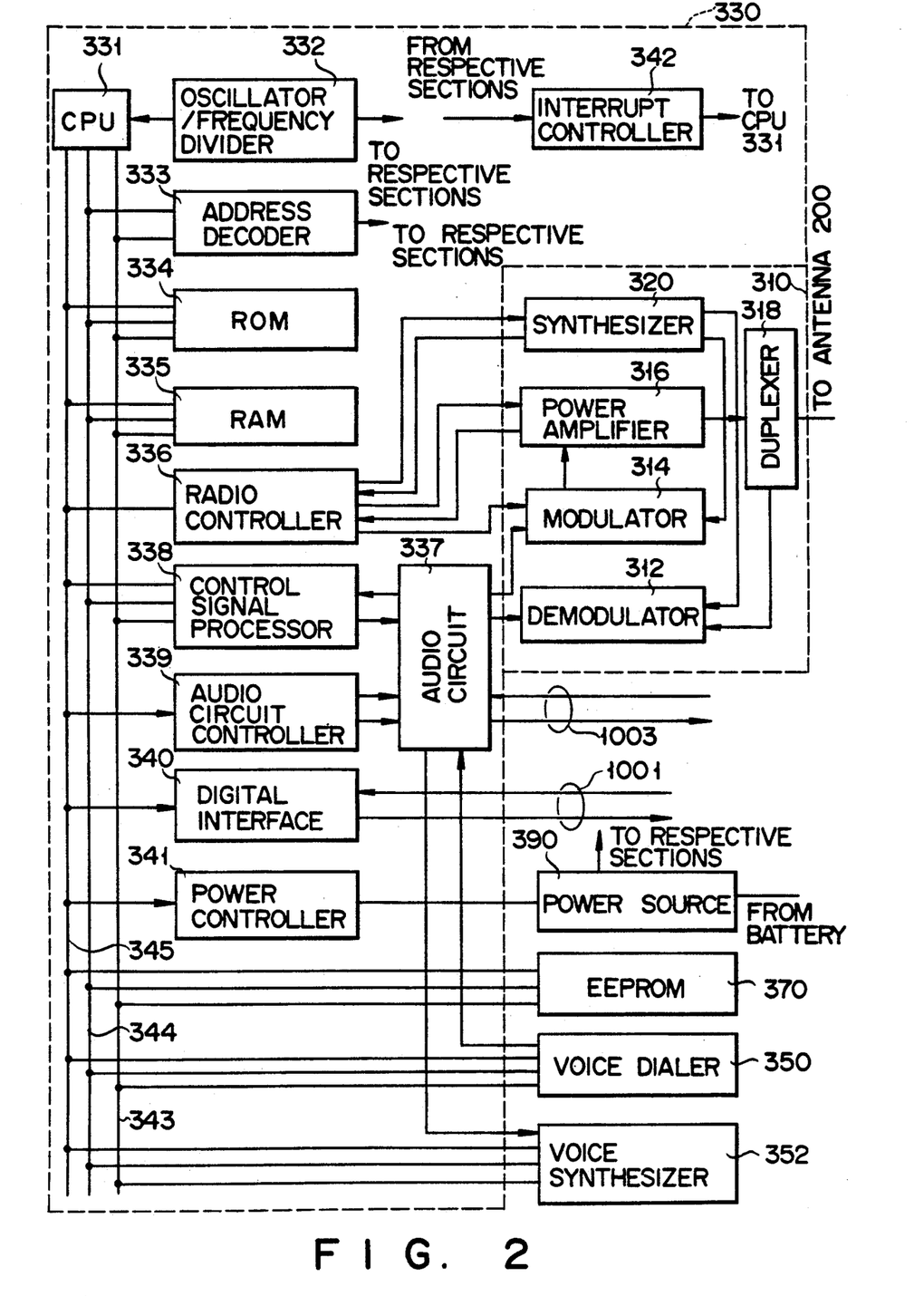
FIG. 2 is a detailed block diagram showing the radio unit controller depicted in FIG. 1.

The details of the radio unit 300 is shown in FIG. 2. The radio section 310 is formed of a demodulator 312, a modulator 314, a power amplifier 316, a duplexer 318, and a synthesizer 320. The demodulator demodulates a reception signal which is transmitted from the base station to be received via the radio channel 600, the antenna 200, and the duplexer 318. In should be noted that this reception signal includes an audio sound signal and a control signal. The modulator 314 modulates an audio signal and a control signal which are output from the radio unit controller 330 to form a transmission signal. The power amplifier 316 amplifies the transmission radio signal output from the modulator 314. The duplexer 318 outputs the reception signal to the demodulator 312 when a reception signal is suppled via the radio channel 600 and the antenna 200, and outputs the transmission signal to the antenna 200 when a transmission signal is supplied via the modulator 314 and power amplifier 316. The synthesizer 320 is formed of a channel selection local oscillator and selects a radio channel by specifying a frequency from which signals are demodulated by the demodulator 312, and a frequency to which signals are modulated by the modulator 314.

The radio unit controller 330 comprises a central processor unit (CPU) 331, an oscillator/frequency divider 332, an address decoder 333, a ROM 334, a RAM 335, a radio controller 336, an audio circuit 337, a control signal processor 338, an audio circuit controller 339, a digital interface 340, a power controller 341, and an interrupt controller 342. The CPU 331 is connected to each of the components via a data bus 343, an address bus 334, and a control bus 345, all of which are formed of 8-bit bus lines.

The CPU 331 controls the whole operation of the radio unit controller 330. The oscillator/frequency divider 332 supplies necessary clock signals to the CPU 331, and frequency-divides the clock signals appropriately in order to supply the divided signals as timing signals to each of the sections of the telephone apparatus. The address decoder 333 outputs a predetermined operation signal to each of the sections in response to an instruction sent from the CPU 331. The ROM 334 stores various program required for operation of the CPU 331, and the RAM 335 stores various types of data during processing by the CPU 331.

The radio controller 336 controls the radio section 310 in response to an instruction from the CPU 331. For example, the radio controller 336 sends the instruction of a designated frequency to the synthesizer 320, that of an amplification factor to the power amplifier 316, and that of a modulation parameter to the modulator 314. Further, in order to prevent an erroneous operation, the radio controller 336 receives a step-out signal from the synthesizer 320 and an output power detection signal from the power amplifier 316, and transfers these signals to the CPU 331.

The audio circuit 337 extracts a control signal and an audio signal from the received signals demodulated by the demodulator 312, and supplies the control signal to the control signal processor 338, the audio signal to the voice synthesizer 352 and the telephone unit 400. The audio circuit 337 also supplies a control signal output from the control signal processor 338, and an audio signal output from the voice dialer 350, to the modulator 314. It should be noted that this audio circuit 337 serves to shape the waveform of the control signal to be sent to the control signal processor 338 in a particular signal format, and to filter the control signal to be supplied to the modulator 314.

The control signal processor 338 performs bit and frame synchronizations with respect to the control signal supplied from the audio circuit 337. This control signal processor receives control data contained in the serial control signals from the base station as parallel signals. Meanwhile, it supplies the parallel control signal to be transmitted to the base station to the audio circuit 337 as serial control signals.

The audio circuit controller 339 controls each of the sections of the audio circuit 337. For example, the audio circuit controller 339 carries out switching control to supply a reception signal from the audio circuit 337 to either one of the control signal processor 338, voice dialer 350, and telephone unit 400, and another switching control to guide either one of transmission signals from the control signal processor 338, voice dialer 350, and telephone unit 400, to the audio circuit 337.

The digital interface 340 interfaces the data communication between the radio unit 300 and the telephone unit 400.

The power controller 341 controls the power source 390. For example, the power controller 341 sets a voltage which is supplied from the battery to the power source 390, to a predetermined level. The voltage set to the level is then supplied to each of the components of the telephone apparatus.

The interrupt controller 342 carries out an interruption to the CPU 331 in response to an interrupt instruction from each of the components.

Figure 3:
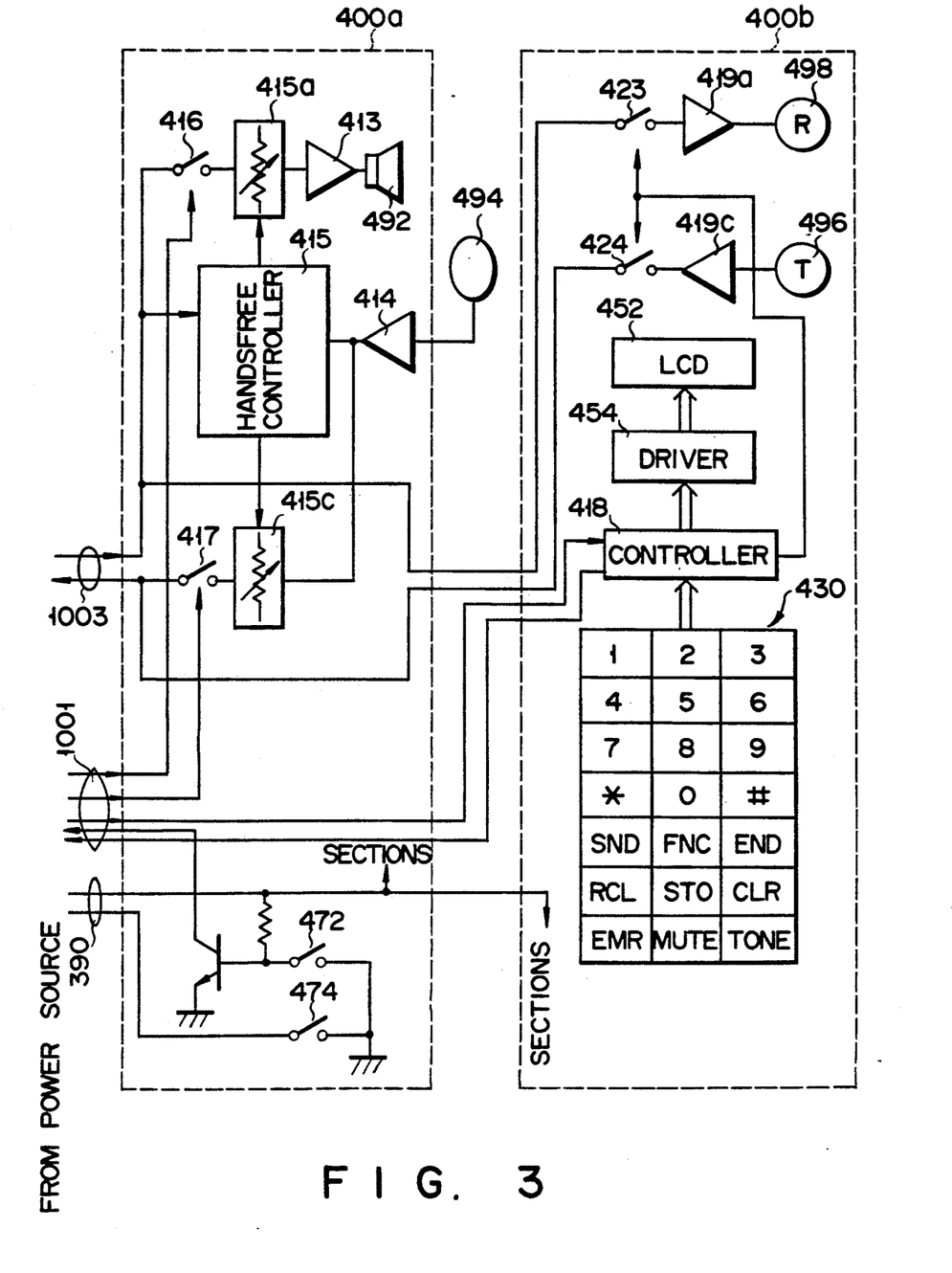
FIG. 3 is a detailed block diagram showing the telephone unit depicted in FIG. 1.

The details of the telephone unit 400 is shown in FIG. 3. The telephone unit is formed of a main body 400a, a handset 400b, and a hands-free microphone 494. The main body 400a comprises amplifiers 413 and 414, a hands-free controller 415, attenuators 415a and 415c, switches 416 and 417, a speaker 492, a hook switch 472, and an ON/OFF switch 474.

The amplifier 413 amplifies a speech signal which is supplied from the audio circuit 337 in the radio unit 300, and the amplified signal is output from the speaker 492. The amplifier 414 amplifies a speech signal, which is input from the hands-free microphone 494, and sends the amplified signal to the audio circuit 337.

The hands-free controller 415 controls the attenuation rate of a speech signal input to the amplifier 413, and that of a speech signal output from the amplifier 414 by means of the attenuators 415a and 415c, thereby preventing howling resulting from an acoustic coupling between the speech signal received and the speech signal input from the hands-free microphone 494.

The switch 416 is used for switching of whether or not the speech signal sent from the audio circuit 337 is output from the speaker 492, whereas the switch 417 is used for switching of whether or not the speech signal from the hands-free microphone 494 is output to the audio circuit 337. The switching operation of the switches 416 and 417 is accomplished by the control signal output from the radio unit controller 330 of the radio unit 300.

The hook switch 472 detects an on-hook or an off-hook state of the handset 400b. The detected signal is output to the radio unit controller 33 of the radio unit 300 The ON/OFF switch 474 is used for turning on/off of the entire apparatus, and the switching signal is sent to the radio unit controller 330 of the radio unit 300.

The handset 400b comprises a controller 418, amplifiers 419a and 419c, switches 423 and 424, a liquid crystal display (LCD) device 452, an LCD driver 454, a keyboard 430 formed of a plurality of key pads, a handset microphone 496, and a handset receiver 498.

The controller 418 controls the whole operation of the handset 400b in accordance with a control signal output from the radio unit controller 33 of the radio unit 300, and send a control signal input from the keyboard 430 to the radio unit controller 330 of the radio unit 300. The amplifier 419a amplifies a speech signal sent from the audio circuit 337, and the amplified speech signal is output from the handset receiver 498. The amplifier 419c amplifies a speech signal input from the handset microphone 496, and the amplified speech signal is sent to the audio circuit 337. The switch 423 is used for switching of whether or not the speech signal output from the audio circuit 337 is output from the handset receiver 498, whereas the switch 424 is used for switching of whether or not the speech signal input from the handset microphone 496 is output to the audio circuit 337. The switching operation of the switches 423 and 42 is carried out by the controller 418.

The LCD device 452 is formed of a multi-digit numeral display section and a display section representing each of the various functions. The LCD driver 454 drives the LCD device 452 under the control of the controller 418, so as to render the device carry out a predetermined display. The keyboard 430 comprises key pads of numerals keys "0" to "9", and function keys "*", "#", "SND", "FNC", "MUTE", and "TONE". When a key pad is depressed, the key is identified by the controller 418.

The operation of the embodiment described above will now be explained.

Figure 4:
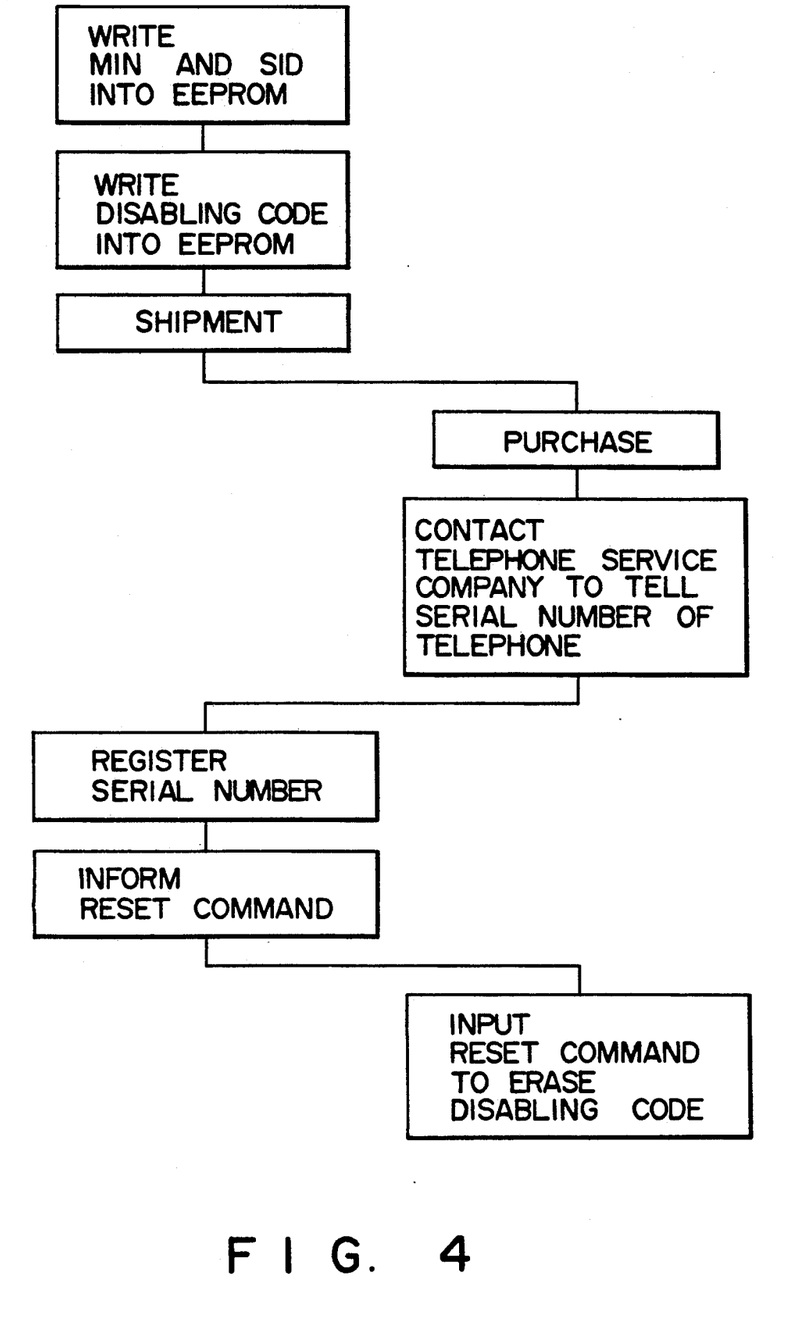
FIG. 4 is a flow chart explaining a basic course of the product of the embodiment from the shipment to the start of use.

First, a course of the present invention from the time of shipment to the start of actual use will be described with reference to FIG. 4. Unlike the cases of the prior art devices, a telephone number MIN and a corresponding system identification number SID in the area, are written into the EEPROM 370 along with an operation disabling code in advance before the time of shipment by the manufacturer or the automobile telephone service company. More specifically, the identification numbers used as the condition for enabling the communication operation of the telephone are already written into the memory along with the operation disabling code before the shipment. If telephones having only the identification numbers written into the EEPROM are sold to users, they can use the phones without making contract with the company and paying the fee for use thereto. To prevent such an inconvenience, the company writes a predetermined operation disabling code into the EEPROM 370 before the shipment so that the telephone cannot be used at the time of purchase. It should be noted that this operation disabling code is erasable by a purchaser.

Thus, the purchaser cannot use the phone as it is purchased. The purchaser, at the time of purchase, applies for registration for use of the apparatus, as instructed in the user's manual thereof attached to the product. The registration may be conducted by means of phone or mail without actually visiting a service branch of the company unlike the case of the prior art devices. At the time of registration as a user, the purchaser informs the company of the serial number of the telephone purchased, along with his or her name and address to make a contract with the company. When the contract has been settled, the automobile telephone service company gives the purchaser the instruction of how to erase the operation disabling code. For example, the disabling code stored in the EEPROM 370 may be erased by the CPU 331 upon input of a reset command. In terms of maintaining secrecy, this reset command should be different from one to another. Further, it is suggested that the disabling code, which differs from a telephone to another, be the same as the reset command so that correspondence between the product and the ID numbers can be easily recognized. Of course, the above described example of the operation disabling code and the reset command is one of a variety of cases, and they may be varied as desired. In this example, the disabling code coincides with the reset command. However, another example in which the disabling code does not coincide with the reset command, the same operation disabling code, such as a flag, is stored in the respective telephone, and only the reset command is different from one to another, may be also considered.

Figure 5:
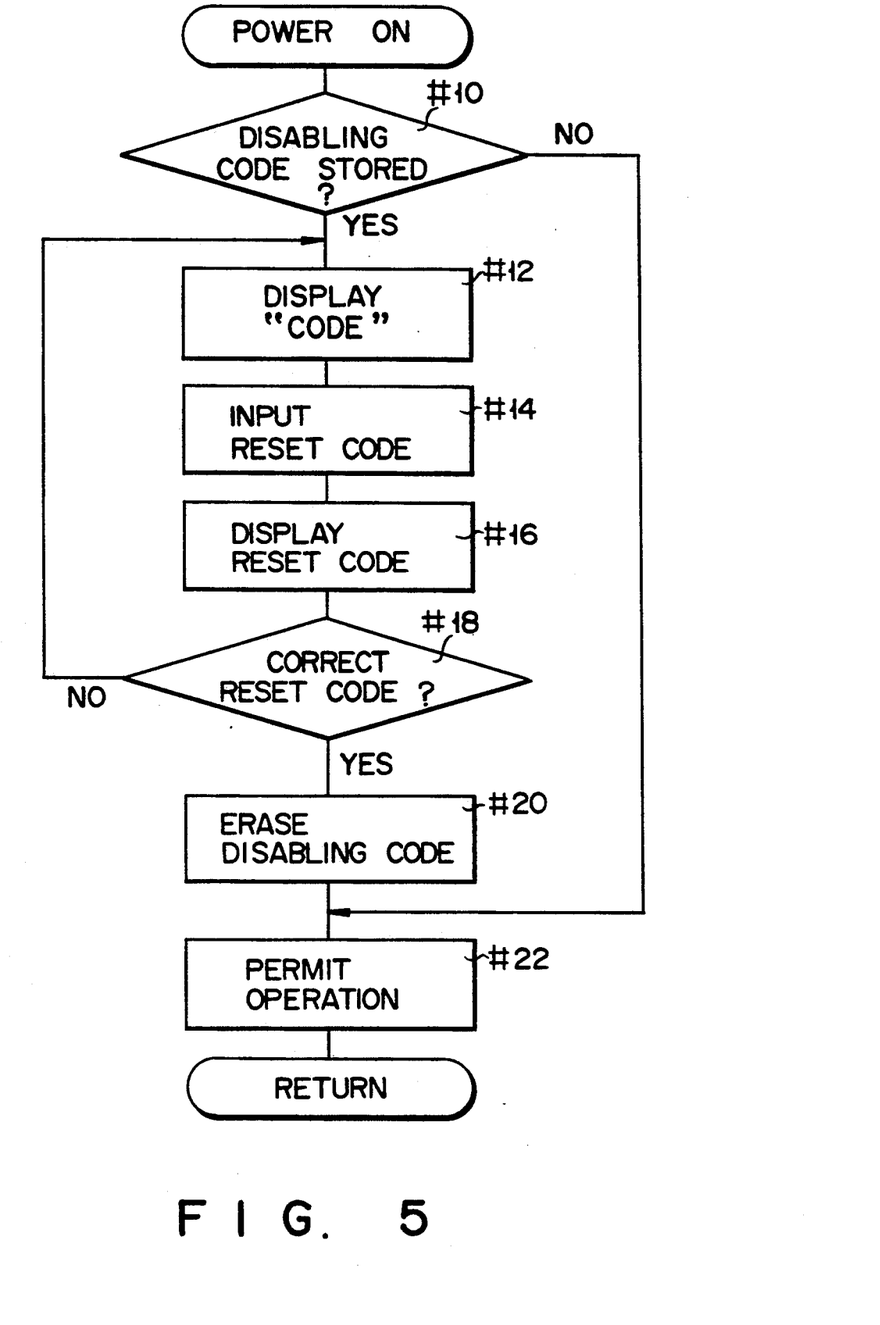
FIG. 5 is a flow chart describing the operation of the embodiment.

Erasing of the operation disabling code by the user, i.e. the set-up operation for enabling the use of the apparatus, will now be explained with reference to FIG. 5. Upon turning on the telephone apparatus by switching the power, the CPU 331 judges whether or not an operation disabling code has been written in the EEPROM 370 in step #10. This judgment is carried out in the following manner. The judgment regarding whether or not the disabling code has been written in the EEPROM 370 can be conducted by examining the data of the address of the disabling code since the address is fixed in the EEPROM. Then, if the disabling code is detected, "CODE" is displayed on the LCD display 452 in step #12, which implies that the operation disabling code has been stored in the EEPROM 370, disabling the communication operation of the telephone, and a reset code (disabling code) as an erasing command must to be input to erase the disabling code.

When it is detected that the reset code has been input in step #14, the reset code input is displayed as an assurance in step #16. In step #18, it is judged whether or not the reset code input is correct, that is, whether the input code coincides with the operation disabling code stored in the EEPROM 370. In case where the code is incorrect, the procedure returns to the step #12 for reentry of a reset code. On the other hand, in the case where the code is correct, the CPU 331 erases the operation disabling code stored in the EEPROM 370 in step

20, so as to allow the operation of the apparatus as can be seen in step #22. Thus, the telephone apparatus is disabled as long as the operation disabling code is stored in the EEPROM 370 and is enabled after the input of the reset command which is informed to the user at the time of contract.

As described above, according to this embodiment, an operation disabling code, which disables the telephone apparatus, is written into the EEPROM 370 along with the ID numbers before shipment of the product. When a purchaser purchases the product, he or she signs a contract with the telephone service company and the company gives him or her an instruction for erasing the operation disabling code. The purchased telephone apparatus is ready to be used when the user erases this disabling code as instructed. Thus, the telephone apparatus can be used at the time of purchase, without bringing the apparatus to a service branch or sending the IDROM of the apparatus to the company by mail. Further, erasing of the disabling code can be carried out by simply inputting code data. Moreover, in order to prevent the wrongful use of the apparatus, i.e. use of the apparatus without making a contract, which may be conducted by wrongfully erasing the disabling code, a different disabling code is assigned to each of the telephone apparatus, and a reset code, which is used for erasing the disabling code, is made identical to the disabling code.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the disabling code and the ID numbers may be written in the EEPROM by the different persons. The disabling code can be written in the EEPROM anytime before it is sold to a purchaser, and thus can be written therein by a seller, not by a manufacture. Moreover, the present invention can be applied not only to an automobile telephone apparatus as described above, but also to other radio telecommunication apparatus such as personal radio telecommunication apparatus, etc..

What is claimed is:

1. A radio telecommunication apparatus, comprising:
   a memory;
   detecting means for detecting a presence or an absence of data at a predetermined location in said memory;
   operation control means for disabling operation of said apparatus if the presence of data at the predetermined location is detected, and for enabling operation of said apparatus if the absence of data at the predetermined location is detected; and
   erasing means for erasing data the predetermined location whereby said detecting means detects an absence of data at the predetermined location.

2. The apparatus according to claim 1, wherein said memory is an electrical erasable programmable read-only memory.

3. The apparatus according to claim 1, wherein said erasing means includes input means for inputting data, comparing means for comparing the data input via said input means with data at the predetermined location, and means for erasing the data at the predetermined location in response to a predetermined relationship between the input data and the data at the predetermined location.

4. The apparatus according to claim 3, further comprising means for prompting a user to input data via said input means when said detecting means detects the presence of data at the predetermined location.

5. The apparatus according to claim 1, further comprising alarm means for generating an alarm when said detecting means detects the presence of data at the predetermined location.

6. The apparatus according to claim 1, wherein the data at the predetermined location is pre-programmed data.

7. The apparatus according to claim 1, wherein the data at the predetermined location in memory is an operation disabling code.

8. The apparatus according to claim 7, wherein said erasing means is responsive to a user-supplied erasing command.

9. The apparatus according to claim 1, wherein the data at the predetermined location in memory is a flag.

10. A method for setting up radio telecommunication apparatus shipped from a shipping location to a plurality of users, each said apparatus including a memory for storing operation control data at a predetermined memory location, and a controller for disabling operation of said apparatus when the operation control data is present at the predetermined memory location, the method comprising the steps of:
    writing the operation control data to the predetermined location of the memories of each of said apparatus before the shipment of said apparatus;
    shipping the apparatus to said users;
    subsequently providing said users with an erase code for erasing the operation control data from the predetermined memory location to enable operation of said apparatus.

11. The method according to claim 10, wherein different operation control data is written to each of said apparatus, and the erase code for each apparatus is the same as the operation control data of the apparatus.

12. The method according to claim 10, further comprising the step of generating an alarm indicating that operation of the apparatus has been disabled, upon turning on the power of the apparatus, if said operation control data is present at the predetermined memory location.

13. A radio telecommunication apparatus comprising:
    a first memory for storing identification numbers of said apparatus;
    transmission/reception means for transmitting/receiving a call in accordance with said identification numbers;
    a second memory having a predetermined memory location for storing an operation disabling code, which can be electrically erased;
    detecting means for detecting a presence or an absence of said operation disabling code at the predetermined location in said second memory;
    disabling means for disabling operation of said transmission/reception means if the presence of said operation disabling code is detected; and
    erasing means for erasing said operation disabling code at the predetermined memory location.

14. The apparatus according to claim 13, wherein said erasing means includes input means for inputting data, comparing means for comparing the data input via said input means with said operation disabling code, and means for erasing said operation disabling code at the predetermined location in response to a predetermined relationship between the input data and the data at the predetermined location.

15. The apparatus according to claim 14, wherein said erasing means further includes a display for prompting a user to input data if the presence of said operation disabling code is detected.

16. The apparatus according to claim 13, wherein said apparatus is an automobile telephone apparatus, and said identification numbers are a system identification number indicating a base station, and a mobile identification number indicating a mobile station.

17. The apparatus according to claim 13, wherein said apparatus is a personal telecommunication apparatus.

* * * * *